Jan. 9, 1934.   E. LOOSBROCK   1,942,435

BATTERY CONNECTER

Filed Nov. 5, 1932

Inventor
Edward Loosbrock

Witness
H. Woodard

By H. R. Wilson & Co.
Attorneys.

Patented Jan. 9, 1934

1,942,435

UNITED STATES PATENT OFFICE 1,942,435

BATTERY CONNECTER

Edward Loosbrock, Lincoln, Nebr.

Application November 5, 1932. Serial No. 641,416

2 Claims. (Cl. 173—259)

The invention relates to devices for connecting battery terminal posts with conducting cables, and it aims to provide a new and improved device for this purpose, in which the cable is anchored to the post-engaging part of the connecter in a novel way, and in which a wedge which holds said post-engaging part of the connecter upon the terminal post, contacts tightly with said post and tightly with the ends of the wires from which the cable is constructed, thus producing a structure having unimpaired conductivity.

With the foregoing in view, the invention resides in the novel subject matter hereinafter described and claimed, description being accomplished by reference to the accompanying drawing.

Figure 1:
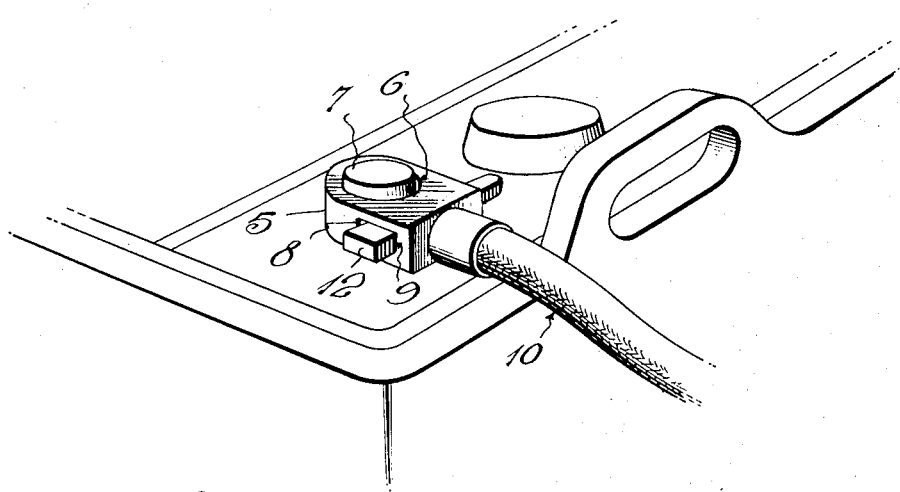
Fig. 1 is a perspective view showing the connecter upon a battery terminal post.

The device includes a suitably shaped block 5 having an opening 6 to receive a conventional battery terminal post 7, said block being provided also with a wedge-receiving slot 8 which intersects one side of the opening 6, said slot 8 having a wall 9 laterally spaced from the wall of said opening.

Figure 2:
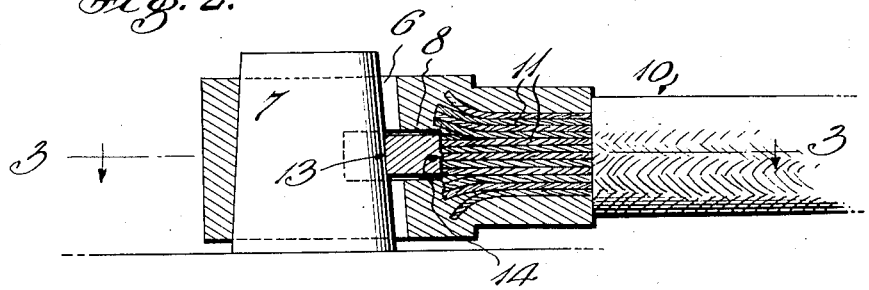
Fig. 2 is a vertical longitudinal sectional view through the connecter.
Figure 3:
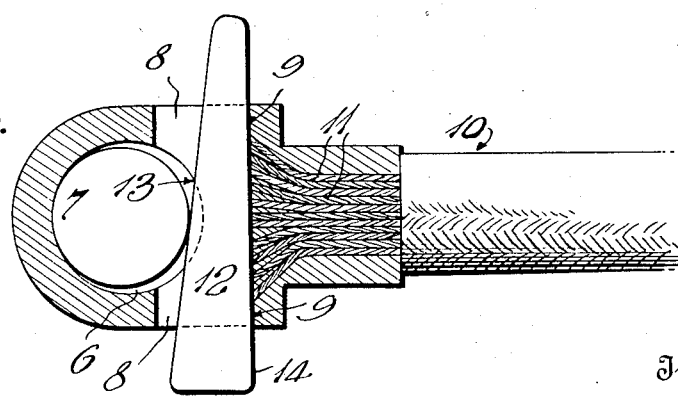
Fig. 3 is a horizontal sectional view on line 3—3 of Fig. 2.

A conducting cable 10 formed of various wires 11, has the ends of these wires embedded in block 5, said wire ends being exposed at the slot wall 9 and being preferably bent into diverging relation as shown in Figs. 2 and 3, for tenacious anchorage. The block 5 is molded from suitable metal, glass, rubber or other suitable material, and this metal, glass, rubber, or other suitable material is poured around the ends of the wires 11, so that said wires and the block become virtually an integral structure and there can be no faulty conduction between them, if the block be of metal, as often occurs with conventional connecters.

A wedge 12 is provided for reception in the slot 8, said wedge having one surface 13 for contact with said terminal post 7, and another surface 14 for contact with the slot wall 9 and the exposed ends of the wires 11. When this wedge is tightly in place, it securely holds the entire connecter upon the post 7, and serves effectively as a current conductor, in view of its direct contact with the ends of the wires 11 and the aforesaid post.

The details disclosed are preferably followed, but within the scope of the invention as claimed, minor variations may be made.

I claim:

1. A battery connecter comprising a one-piece metal block having a continuous-walled opening to receive a terminal post, said block being provided with a slot intersecting one side of said opening, said slot having a side wall spaced laterally outward from said opening, a conducting cable secured to the block and formed of a plurality of wires having their ends exposed at the aforesaid side wall of said slot, and a longitudinally tapered metal wedge in said slot to engage the terminal post, said wedge having a surface contacting with said exposed wire ends.

2. A battery connecter comprising a one-piece metal block having a continuous-walled opening to receive a terminal post, said block being provided with a slot intersecting one side of said opening, said slot having a side wall spaced laterally outward from said opening, and a conducting cable formed of a plurality of wires having their ends spread and imbedded in said one-piece metal block, said wire ends being exposed at the aforesaid side wall of said slot, and a longitudinally tapered metal wedge in said slot to engage the terminal post, said wedge having a surface contacting with said exposed wire ends.

EDWARD LOOSBROCK.